(12) United States Patent
Joly

(10) Patent No.: US 12,350,843 B2
(45) Date of Patent: Jul. 8, 2025

(54) SYSTEMS AND METHODS FOR UPDATING THE CORRECTION COEFFICIENT OF AN INDUSTRIAL ROBOT FORCE SENSOR

(71) Applicant: STAUBLI FAVERGES, Faverges-Seythenex (FR)

(72) Inventor: Luc Joly, Faverges-Seythenex (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 173 days.

(21) Appl. No.: 18/207,581

(22) Filed: Jun. 8, 2023

(65) Prior Publication Data

US 2023/0398691 A1    Dec. 14, 2023

(30) Foreign Application Priority Data

Jun. 13, 2022  (FR) ...................................... 2205696

(51) Int. Cl.
*B25J 9/16* (2006.01)
*B25J 13/08* (2006.01)
*G01L 25/00* (2006.01)

(52) U.S. Cl.
CPC ........... *B25J 9/1692* (2013.01); *B25J 13/085* (2013.01); *G01L 25/00* (2013.01)

(58) Field of Classification Search
CPC ...... B25J 9/1692; B25J 13/085; B25J 9/1694; G01L 25/00; G05B 2219/37016; G05B 2219/39058; G05B 2219/39529; G05B 2219/40599
USPC ................. 700/245–264; 318/568.11–568.25
See application file for complete search history.

(56) References Cited

U.S. PATENT DOCUMENTS

| | | | | |
|---|---|---|---|---|
| 4,620,436 A | * | 11/1986 | Hirabayashi | B25J 9/1692 73/1.15 |
| 6,741,911 B2 | * | 5/2004 | Simmons | B25J 9/1689 318/568.17 |
| 8,224,484 B2 | * | 7/2012 | Swarup | A61B 34/74 700/245 |
| 11,504,197 B1 | * | 11/2022 | Noonan | A61B 34/70 |
| 11,648,681 B2 | * | 5/2023 | Ju | B25J 9/1607 700/245 |
| 11,666,404 B2 | * | 6/2023 | Overmyer | A61B 17/00 606/1 |
| 11,982,583 B2 | * | 5/2024 | Tomo | G01L 1/12 |

(Continued)

FOREIGN PATENT DOCUMENTS

JP    H0843220 A    2/1996

OTHER PUBLICATIONS

App No. FR 2205696; Search Report mailed Jan. 23, 2023.

*Primary Examiner* — Jaime Figueroa
(74) *Attorney, Agent, or Firm* — MARSHALL, GERSTEIN & BORUN LLP

(57) ABSTRACT

A method for automatically calibrating an external force measuring device of an industrial robot. The industrial robot has a multi-axis robot arm, the robot arm has, for each joint axis, an electric actuator (M1, . . . M6) and a position sensor (C1, . . . C6) able to measure the joint position of the corresponding joint. The robot has a force measuring device. The force measuring device has at least one measuring sensor capable of measuring the forces applied to the robot arm. The method updates an applied force correction coefficient by incrementing it with a value proportional to the average force of the external forces exerted if certain conditions are met.

11 Claims, 6 Drawing Sheets

(56) References Cited

U.S. PATENT DOCUMENTS

| | | | |
|---|---|---|---|
| 2003/0030397 A1* | 2/2003 | Simmons | B25J 9/1689 |
| | | | 318/568.11 |
| 2009/0088775 A1* | 4/2009 | Swarup | A61B 34/71 |
| | | | 700/264 |
| 2014/0180310 A1* | 6/2014 | Blumenkranz | A61B 34/37 |
| | | | 901/41 |
| 2016/0167231 A1 | 6/2016 | Nakayama et al. | |
| 2018/0169854 A1* | 6/2018 | Shiratsuchi | B25J 11/0095 |
| 2019/0077017 A1 | 3/2019 | Shimodaira | |
| 2019/0105785 A1 | 4/2019 | Meyer et al. | |
| 2020/0061816 A1 | 2/2020 | Karito et al. | |
| 2020/0130199 A1* | 4/2020 | Morioka | B25J 9/0081 |
| 2021/0059777 A1* | 3/2021 | Overmyer | A61B 34/71 |
| 2022/0120630 A1* | 4/2022 | Tomo | G01L 25/00 |
| 2022/0361966 A1* | 11/2022 | Khalifa | A61B 34/74 |
| 2022/0361968 A1* | 11/2022 | Noonan | A61B 1/00149 |

* cited by examiner

SYSTEMS AND METHODS FOR UPDATING THE CORRECTION COEFFICIENT OF AN INDUSTRIAL ROBOT FORCE SENSOR

RELATED APPLICATION

This application claims priority to French Patent Application No. 2205696 filed Jun. 13, 2022, the entire disclosure of which is incorporated by reference herein.

FIELD OF THE DISCLOSURE

The present invention relates to industrial robots, and more particularly to systems and methods for commanding an industrial robot provided with an external force measuring device.

BACKGROUND

Industrial robots, such as robot arms, are increasingly used in direct collaboration with operators, where operators can act directly on the robot. This is the case, for example, in surgical applications, or in certain industrial manufacturing methods, among others.

For example, the operator can act directly on the robot by manipulating and moving part of the robot arm. This movement is the result of an external force applied to the robot and is detected by an external force measuring device of the robot. Based on this feedback, the robot command system modifies instructions to the robot motors accordingly, for example to move or hold the robot arm to the position chosen by the operator, or to accompany a manual movement of the robot by the operator.

To take into account the operator's action on the robot arm, the control system processes force measurements from the external force measurement device which is either a multi-axis sensor positioned between the end of the arm and the tool or a set of sensors each associated with a movement axis.

One disadvantage is that force sensors are subject to drift over time during their operation, which makes it necessary to apply a correction to the measured force value. However, it is necessary to update the value of this correction very regularly. Without this correction, the measured force value will be incorrect, which may cause the robot to malfunction. For example, this can lead to undesired movements of the robot when it is controlled based on the information from the force sensor.

There is therefore a need for industrial robot command systems and processes that include force sensor(s) whose calibration can be updated automatically.

SUMMARY

According to one aspect, the invention relates to a method for automatically calibrating an external force measuring device of an industrial robot, said industrial robot comprising a multi-axis robot arm, the robot arm comprising, for each joint axis, an electric actuator and a position sensor able to measure the joint position of the corresponding joint, the robot comprising a force measuring device, the force measuring device comprising at least one measuring sensor capable of measuring the forces applied to the robot arm, the method comprising the steps of:

for a plurality of successive measurement cycles, storing the joint position of the robot arm and calculating the external force exerted on the external force measuring device, the external force exerted being equal to the external force measured by the external force measuring device minus a drift correction coefficient of the external force measuring device applied to the robot arm and the mass effect of the robot;

after a predefined number n of successive measurement cycles, for each subsequent cycle, calculating an indicator of variation in exerted external force and a motion indicator, the indicator of variation in exerted external force being representative of a variation in the external force exerted during the last n measurement cycles, the motion indicator being representative of a variation in joint position during said measurement cycles;

calculating the average force of the external forces exerted during said last n measurement cycles;

updating the correction coefficient by incrementing it with a value proportional to the average force of the external forces exerted if the following conditions are met:

the motion indicator is below a vector of predetermined positional variation thresholds, and the indicator of variation in exerted external force is below a vector of predetermined force variation thresholds, and the average force of the external forces exerted is, in absolute value, less than a vector of predetermined thresholds on the average force.

In some embodiments the force measuring device is a multi-axis force sensor placed between the end of the robot arm and an end effector.

In some embodiments, the force measuring device is a set of force sensors placed at each joint of the robot arm.

In some embodiments, the joint position of the robot arm is given by measurement.

In some embodiments, when updating the correction coefficient, the value proportional to the average force of the external forces exerted is equal to the average force of the external forces multiplied by a proportionality coefficient comprised between 0 and 1.

In some embodiments, the number of successive measurement cycles is greater than 100.

In some embodiments, the updating of the correction coefficient is inhibited if an update of the correction coefficient has already occurred less than a predetermined stabilisation period earlier.

In some embodiments, the vector of predetermined thresholds on average force is calculated from temperature information of the external force measuring device of the industrial robot.

In some embodiments, the indicator of variation in external force exerted is equal to the difference between the maximum external force exerted and the minimum external force exerted during said measurement cycles.

In some embodiments, the motion indicator is equal to the difference between the maximum and minimum joint positions for each joint axis of the robot, during said measurement cycles.

According to another aspect, the invention relates to an industrial robot comprising a multi-axis robot arm, the robot arm comprising, for each joint axis, an electric actuator and a position sensor adapted to measure the joint position of the corresponding joint, the robot comprising an external force measuring device, the external force measuring device comprising at least one measuring device adapted to measure the forces applied to the robot arm, the robot comprising a central processing unit configured to implement a method as described.

BRIEF DESCRIPTION OF THE FIGURES

The invention will be better understood and advantages beyond these will emerge more clearly in light of the following description, given solely by way of example and made with reference to the accompanying drawings, wherein.

To clearly and concisely describe the present invention, the drawings are not necessarily to scale, and that certain features may be presented schematically.

DETAILED DESCRIPTION

Figure 1:
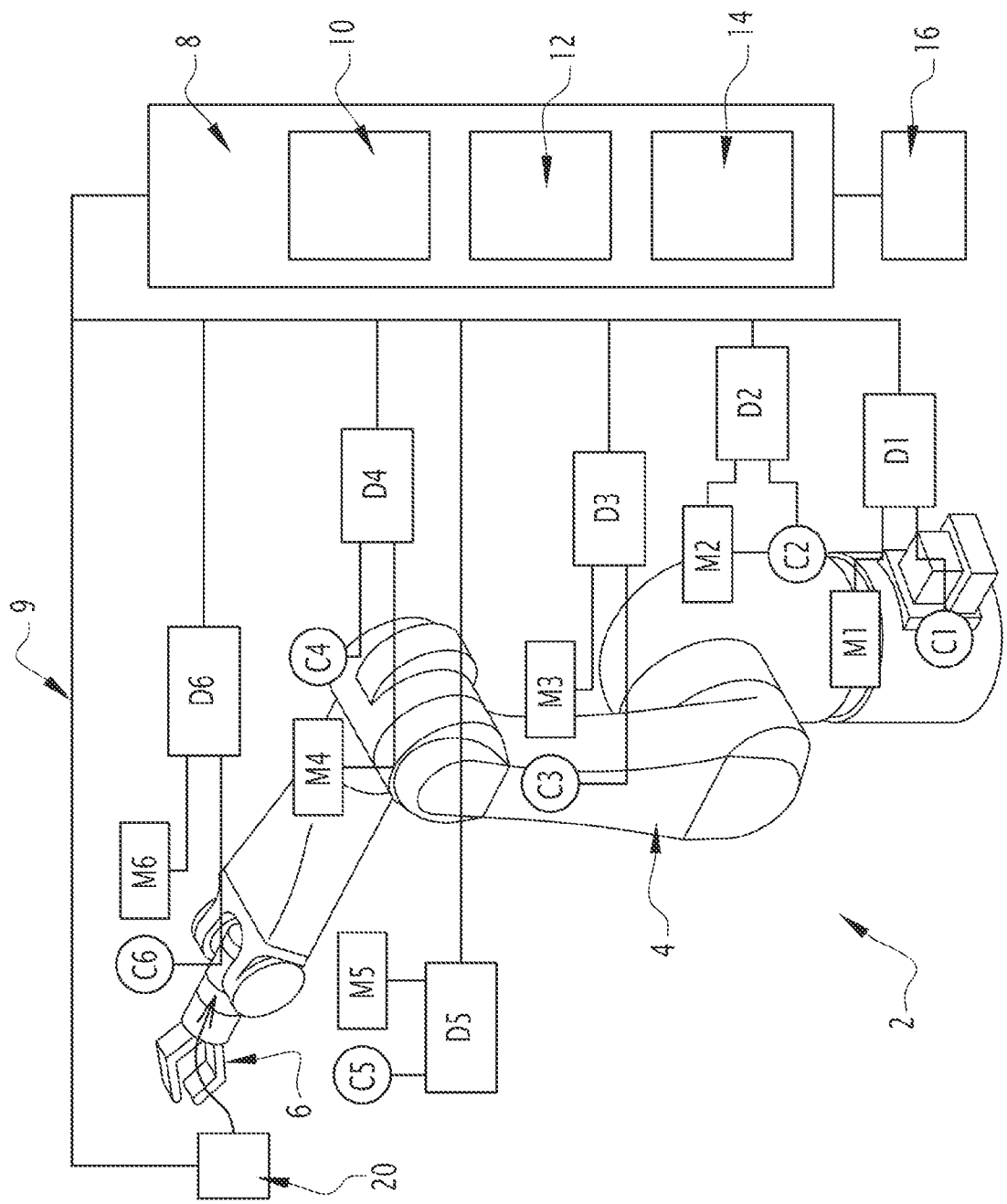
FIG. 1 shows schematically and in structural blocks an industrial robot according to the invention in a first embodiment.

FIG. 1 shows an example industrial robot 2.

The robot 2 comprises a multi-axis robot arm 4. For example, the robot arm 4 has several segments that are articulated in pairs about axes of rotation.

The robot arm 4 may comprise an end effector 6, such as a controllable tool, which is placed at the end of the robot arm 4.

The robot arm 4 has a plurality of electric actuators, denoted M1, M2, M3, M4, M5 and M6 in the example in FIG. 1 (and denoted M1 to M6 hereafter). Each of the electric actuators is capable of rotating or translating one part of the robot arm 4 relative to another part of the robot arm 4 about an axis of movement, such as one of the axes of rotation.

Each electric actuator M1 to M6 has an electric motor, such as brushless synchronous electric motors, or any other suitable electric motor.

The robot 2 also has a plurality of position sensors, denoted C1, C2, C3, C4, C5 and C6 in the example in FIG. 1 (and denoted C1 to C6 hereafter).

Each electric actuator M1 to M6 is associated with a position sensor C1 to C6. Each position sensor C1 to C6 is configured to measure a joint position of that electrical actuator.

For example, the position sensors C1 to C6 are angle sensors, such as rotary encoders, or resolvers, or any suitable sensor. The joint position corresponds, for example, to an angular position of the joint.

Preferably, the robot 2 is a 6-axis robot. The robot arm 4 thus has six degrees of freedom and six electric actuators M1 to M6 and six position sensors C1 to C6.

Each encoder measures the joint position $q_i$, of the corresponding axis, where the index "i" is an integer between 1 and the number of sensors (here equal to 6). The vector of joint positions of all axes is denoted q.

Each position sensor is connected to a control unit, denoted D1, D2, D3, D4, D5 and D6 in the example in FIG. 1 (and denoted D1 to D6 hereafter). The control unit is connected to one of the electric actuators M1 to M6 and is able to ensure the regulated operation of that actuator based on a setpoint.

For example, for an electric actuator M1 to M6, the control unit D1 to D6 is connected to the motor by electrical conductors and generates the currents circulating in the motor phases so as to follow a current, torque, speed or position setpoint. Each control unit D1 to D6 incorporates a position control loop, a speed control loop and a current control loop, the operation of which is paced increasingly quickly.

The robot 2 also includes a command system comprising a central processing unit 8 with a memory and at least one processor (or microcontroller, or DSP, or FPGA) capable of running robot command programs.

Alternatively, the central processing unit 8 may also be composed of a plurality of processors linked by suitable communication means.

The central processing unit 8 is connected to the control units D1 to D6, for example by a communication bus 9, so as to transmit to them, in particular, the instructions for controlling the robot (for example, current, torque, speed and position instructions).

The central processing unit 8 comprises a force control module 10, a self-calibration module 12 of a force measuring device consisting of a multi-axis force sensor and a weight module 14 implementing a weight model, the role of which will be explained in detail in the following.

The central processing unit 8 is preferably connected to a user interface 16, or human-machine interface, which may comprise a display screen and data input means, such as a keyboard, a pointer, a touch screen, a microphone coupled to a voice recognition system, or any other suitable means.

The robot 2 also comprises a force measuring device 20 consisting of a multi-axis force sensor.

The external force measuring device 20 comprises at least one measuring device capable of measuring forces applied to the robot arm 4, such as forces applied manually by a user.

In the embodiment shown in FIG. 1, the external force measuring device 20 is placed between the end of the robot arm 4 and the end effector 6.

Preferably, the multi-axis force sensor of the external force measuring device 20 consists of at least 6 individual measuring systems, such as piezo-resistive strain gauges attached to a test body. The geometric arrangement of the individual measurement systems, which is not necessarily aligned with a canonical Cartesian coordinate system, allows the complete force torsor to be reconstructed by linear combination of the measurements it produces.

The external force measuring device 20 consisting of the multi-axis force sensor is configured to provide a measurement of the measured external force $F_{sensor}$ to the central processing unit 8, for example via the communication bus 9.

In this case, the measured external force $F_{sensor}$ is a 6-dimensional vector representing the force torsor applied to the sensor, combining the three Cartesian coordinates of the force measurement, and the three Cartesian coordinates of the moment measurement.

Figure 2:
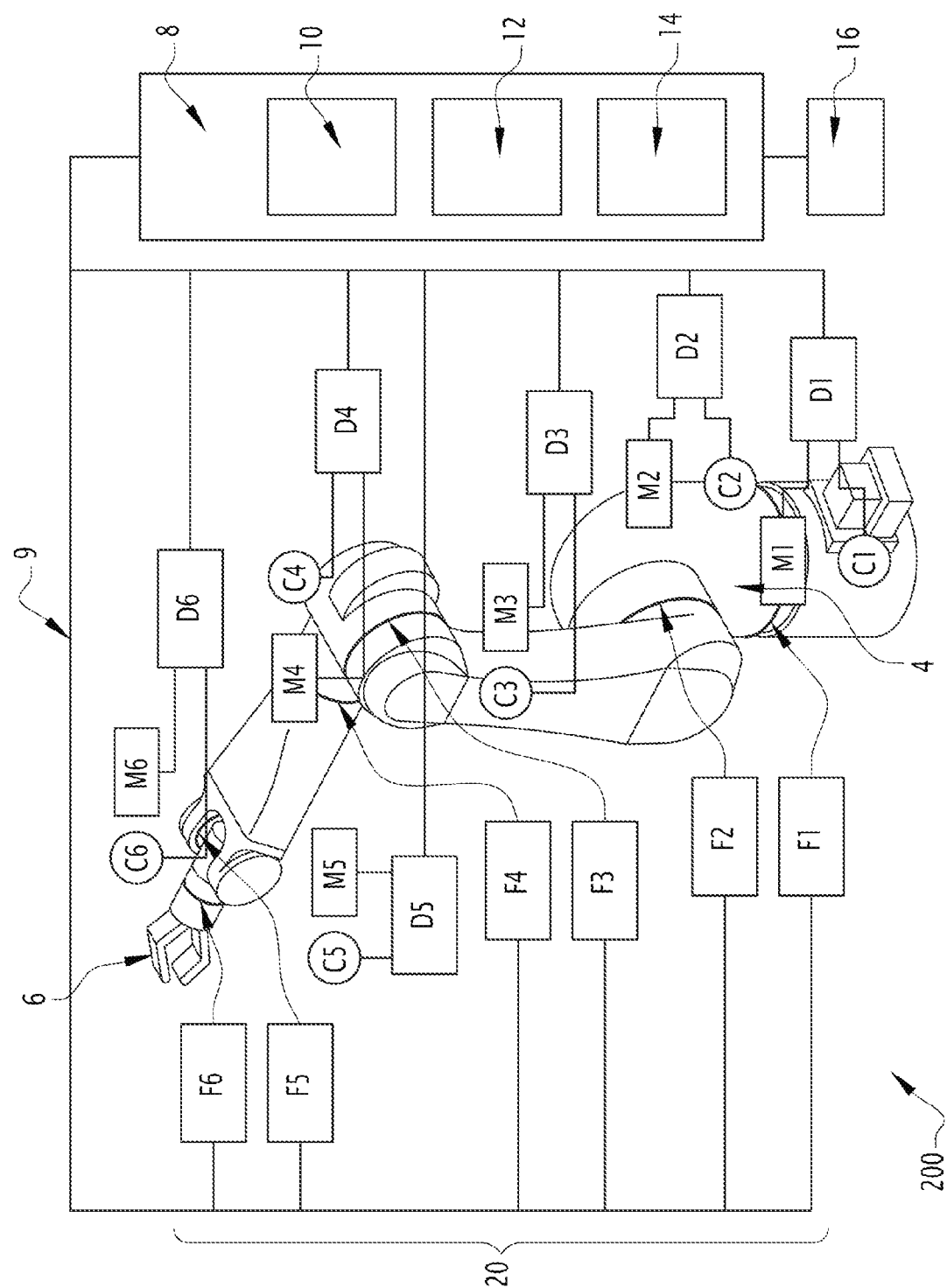
FIG. 2 shows schematically and in structural blocks an industrial robot in a second embodiment.

FIG. 2 represents a second example of an embodiment wherein the single multi-axis force sensor of the first embodiment is replaced by a set of joint force sensors F1, F2, F3, F4, F5 and F6 (denoted F1 to F6 hereinafter) which are each associated with an axis of the robot arm 4 and which each include an electronic circuit capable of transforming the force measurement into a measurement signal, for example a digital measurement signal. The set of joint force sensors F1, F2, F3, F4, F5 and F6 constitute an external force measuring device 20.

For example, the first force sensor F1 of the assembly 20 is associated with the axis of the robot arm that has the first actuator M1 and the first position sensor C1, and so on.

Each joint force sensor F1 to F6 is connected to the central unit, for example via the communication bus 9. In this case, the measured external force $F_{sensor}$ is a 6-dimensional vector, grouping together the measurement signals from the various joint force sensors F1 to F6.

Apart from these differences, the robot 200 of the embodiment shown in FIG. 2 is essentially similar or even identical to the robot 2 described with reference to FIG. 1.

In practice, the measured external force $F_{sensor}$ given by an external force measuring device 20 does not strictly correspond to the real force $F_{real}$ acting on the measuring device. On the contrary, the measured external force is affected by an offset, denoted $F_{real\_offset}$, which is specific to the external force measuring device 20. This dependency is summarised by the following formula:

$$F_{sensor}=F_{actual}+F_{real\_offset}.$$ [Equation 1]

This offset cannot be directly measured and varies over time, particularly as a function of the temperature of the external force measuring device 20 and the signal processing electronics associated with the external force measuring device 20.

During the operation of the robot, especially in hand-guiding operation, the measured external forces $F_{sensor}$ are used by the force control module 10 to control the robot's movement. The force command algorithms use the external force $F_{cor}$ corrected by a correction coefficient $F_{offset}$ (or "estimated offset"). This dependency is summarised by the following formula:

$$F_{cor}=F_{sensor}-F_{offset}.$$ [Equation 2]

According to the invention, one function of the central processing unit 8 and its modules 10, 12 and 14 is to automatically calibrate the external force measuring device 20 by correcting the estimated offset $F_{offset}$. Preferably, calibrating the external force measuring device consists of determining the estimated offset $F_{offset}$ (which is considered to be sufficiently close to the real offset $F_{real\_offset}$), so that the corrected external force $F_{cor}$ is as close as possible to the real force $F_{real}$.

This is because during the operation of the robot 2 or 200, the actual offset varies due to environmental conditions, such as temperature. In general, this is a gradual drift over time. To prevent this drift from disturbing the force control of the robot, it is necessary to recalibrate the external force measuring device 20.

The calibration method described in the invention allows the external force measurement device 20 to be recalibrated without interrupting the operation of the robot 2 or 200 or performing specific manoeuvres, such as a test sequence.

In practice, regardless of the design, the self-calibration module 12 of the central processing unit 8 is configured to update the offset of the external force measuring device from the joint positions q1 to q6 measured by the position encoders C1 to C6 and the measured external force $F_{sensor}$.

The force control module 10 of the central processing unit 8 is configured to calculate and transmit the control instructions p1 to p6 of the control units D1 to D6 as a function of the measured joint positions q1 to q6, the measured external force $F_{sensor}$ and an application program.

For example, the modules are implemented by machine instructions and/or software code executable by the processor of the central processing unit 8 and/or by electronic circuits connected to the central processing unit 8 or forming part of the central processing unit 8.

Figure 3:
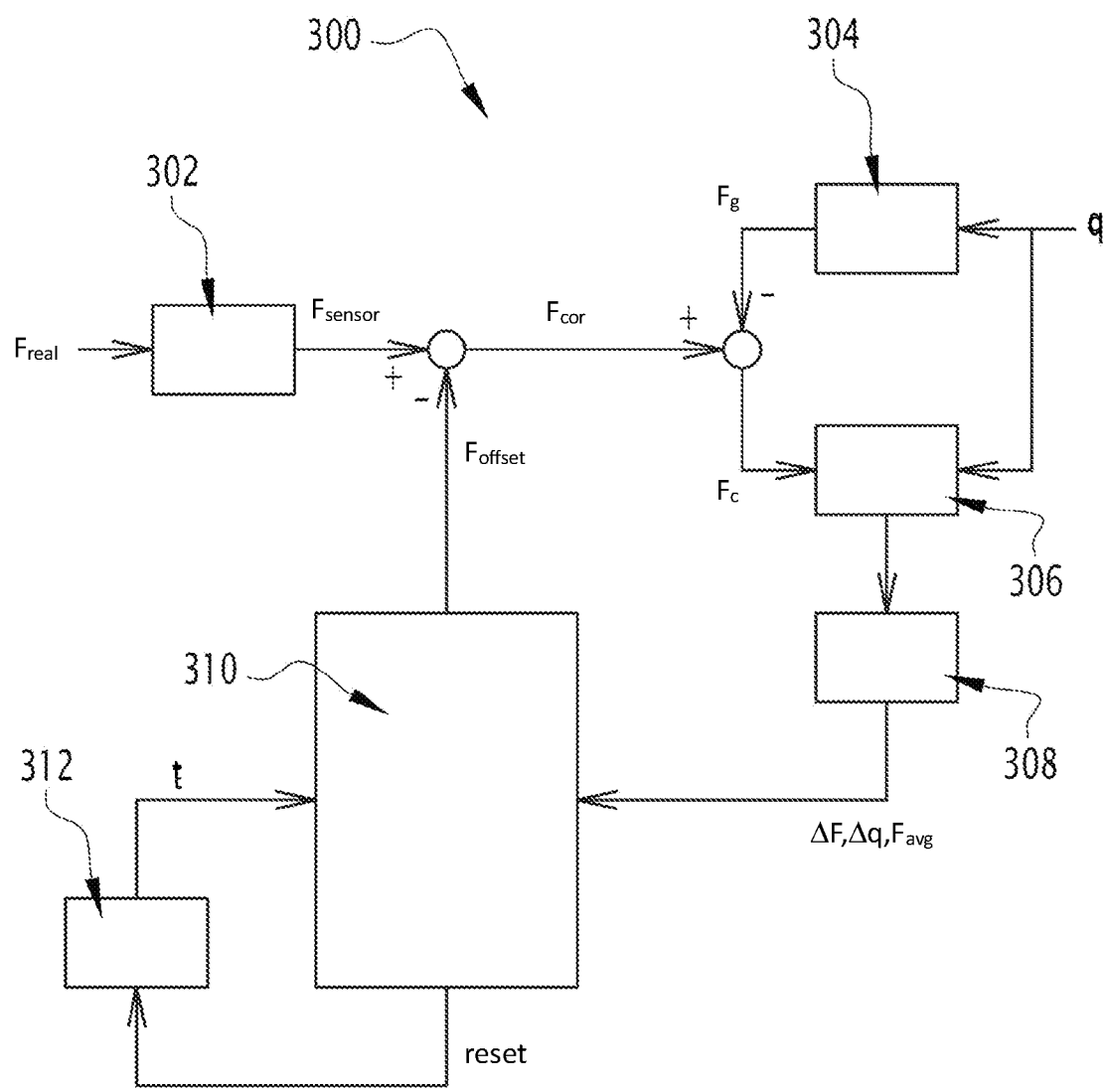
FIG. 3 is a schematic block diagram illustrating a first aspect of the command system according to the invention.

FIG. 3 shows a block diagram 300 illustrating the operation of the self-calibration method, which is performed iteratively during each measurement cycle.

Prior to the execution of the method, an acceptable correction coefficient $F_{offset}$ has first been determined, for example in a manual calibration operation, and then stored, for example within a memory of the central processing unit 8.

The self-calibration module 12 then calculates the exerted external force Fc equal to the measured external force $F_{sensor}$ from the external force measuring device 20 (shown here as 302) from which the current correction coefficient $F_{offset}$ and the mass effect Fg are subtracted. This relationship is summarised by the following formula:

$$F_c=F_{sensor}-F_{offset}-Fg$$ [Equation 3]

In this description, forces are vector quantities. In other words, each of the force vectors $F_{sensor}$, $F_{offset}$, Fc, Fg, . . . has several scalar components, typically six components for a six-axis robot. In the example in FIG. 1, each of the force vectors has three force components and three moment components. In the example shown in FIG. 2, each force vector has six joint force components.

The robot mass effect Fg is a vector that represents the forces that are due to the mass of the elements of the robot arm 4 and the end effector 6 that are measured by the force sensor(s) of the external force measuring device 20.

In the example of FIG. 1, the torsor of the weight of the end effector 6 is the mass effect Fg of the robot and is calculated from the joint positions q1 to q6 corresponding to the moment of the measured external force $F_{sensor}$.

In the example of FIG. 2, the mass effect of the robot Fg is a vector that for each joint, contains the static torque exerted by all the bodies of the robot located downstream of the force sensor of the joint. This vector Fg is calculated from the joint positions q1 to q6, taking the value of these positions for the moment at which the measured external force $F_{sensor}$ is measured.

For these mass calculations, the central processing unit 8 uses the weight module 14, which is able to calculate the mass effect of the robot Fg using a model, called "Weight Model" (reference 304), which is based on a geometric model of the arm and the mass data (position of the centres of gravity of the bodies and associated masses) of the robot arm 4 and the end effector 6. The calculation of the mass effect of the robot Fg requires the knowledge of the joint positions q of the robot as well as the direction in which gravity applies.

The parameters required for this model can be determined even before the robot is in operation from the detailed drawings of the robot arm 4 and its end effector 6 (dimensions, shape, mass).

Alternatively, the parameters of the model can be determined experimentally by measurements carried out before the implementation of the self-calibration. For example, known methods can be used based on force and position measurements for different robot positions, followed by a least squares identification of the parameters.

Returning to the method of FIG. 3, after calculating the external force Fc, the self-calibration module 12 stores (block 306) within a memory (for example a circular buffer) the n last values of the external force Fc, as well as the n last measurements of the joint positions q of the robot, where n is a non-zero integer. In practice, these last n values were recorded for each of the n different successive measurement cycles.

At each iteration, the self-calibration module 12 calculates an indicator of variation in external force exerted ΔF (block 308), which is defined as being equal to the difference between the maximum external force exerted max(Fc) and the minimum external force exerted min(Fc) during said n measurement cycles. This calculation is summarised by the following formula:

$$\Delta F = \max(Fc) - \min(Fc). \quad \text{[Equation 4]}$$

In this formula, the maximum is calculated over the last n recorded values of the external force exerted Fc. More precisely, the maximum is a vector, for example of dimension 6 for a six-axis robot. Each component of the maximum corresponds to a component of the external force exerted Fc. The same applies to the minimum. The indicator of variation in external force exerted ΔF is therefore typically a vector of dimension 6 for a six-axis robot.

Alternatively, each component of the indicator of variation in external force exerted ΔF can be calculated as the standard deviation of the corresponding component of external force exerted Fc. The important thing is that a large value of the indicator of variation in external force exerted ΔF represents a large variation in the external force exerted Fc during the last n cycles.

For each iteration, the self-calibration module 12 also calculates (block 308), for each axis/motor of the robot, a motion indicator Δq defined as equal to the difference between the maximum max(q) and minimum min(q) of the joint positions for each joint axis of the robot. This calculation is summarised by the following formula:

$$\Delta q = \max(q) - \min(q). \quad \text{[Equation 5]}$$

As before, the maximum is calculated over the last n recorded values of the q joint positions. The same applies to the minimum. The motion indicator Δq is therefore typically a vector of dimension 6 for a six-axis robot.

Alternatively, each component of the motion indicator Δq can be calculated as the standard deviation of the corresponding component of q. The important thing is that a large value of the motion indicator Δq represents a significant movement of the robot during the last n cycles.

The self-calibration module 12 also calculates (block 308) the average force of the external forces exerted $F_{avg}$, which is the mean of the external forces exerted $F_c$ over the last n measurements. This calculation is summarised by the following formula, where $F_{avg}$ is a vector as explained above:

$$F_{avg} = \text{mean}(Fc). \quad \text{[Equation 6]}$$

Next (block 310), the self-calibration module 12 compares the calculated vectors with predetermined reference vectors (and more specifically, compares the components of the calculated vectors with the components of the reference vectors), listed below. Depending on the result of the comparison, the $F_{offset}$ correction coefficient is updated, or not.

More precisely, the self-calibration module 12 updates (block 308) the correction coefficient $F_{offset}$ by incrementing it with a value proportional to the calculated average $F_{avg}$ if the following conditions for the reference values are met:
  the motion indicator Δq is below a vector of predetermined positional variation thresholds $\Delta q_{max}$, and
  the indicator of variation in external force exerted ΔF is below a vector of predetermined force variation thresholds $\Delta F_{max}$, and the average force of the external forces exerted $F_{avg}$ is, as an absolute value, less than a vector of predetermined thresholds on the average force $F_{max}$.

$\Delta q_{max}$ is a vector of predetermined thresholds on the positional change. If the motion indicator Δq is less than the predetermined threshold vector of positional change $\Delta q_{max}$, it means that the robot's position has changed little over the last n measurements.

$F_{max}$ is a vector of predetermined thresholds on the average force. If the average force of the external forces exerted $F_{avg}$ is, as an absolute value, lower than the vector of predetermined thresholds on the average force $F_{avg}$, it means that the measured average force (with offset and gravity compensated) is low.

$\Delta F_{max}$ is a vector of predetermined thresholds on the force change. If the indicator of the variation of the external force exerted ΔF is lower than the vector of predetermined thresholds of force variation $\Delta F_{max}$, for all the components of the vector, it means that the external force exerted Fc has changed little during the last n measurements.

If these conditions are all met, then the robot can be considered to be stationary and without external contact, and the self-calibration module uses the average force of the external forces exerted $F_{avg}$ to update the correction coefficient $F_{offset}$.

As explained, the self-calibration module 12 updates the correction coefficient $F_{offset}^{k}$ (current value) by incrementing the previous value ($F_{offset}^{k-1}$) with a value proportional to the average force of the external forces exerted $F_{avg}$. This calculation is summarised by the following formula:

$$F_{offset}^{k} = F_{offset}^{k-1} + a \times F_{avg} \quad \text{[Equation 7]}$$

Advantageously, the proportionality coefficient "a" is between 0 and 1.

If the proportionality coefficient "a" is close to 0, the correction coefficient is little changed (more confidence is placed in the previous value). If the proportionality coefficient "a" is equal to 1, the correction coefficient is changed in the same way as for a traditional calibration.

In fact, traditionally, the calibration of the external force measuring device takes place during a specific procedure independent of the phases of use of the robot as a manipulator, during which no external force is applied to the external force measuring device apart from the weight of the end effector carried by the robot (and that of the robot segments in the second example of implementation) and assumed to be known.

Optionally, in the method of FIG. 3, the self-calibration module 12 may implement a temporary inhibition (represented by block 312 and arrow "t" in FIG. 3), or "timer", which suspends self-calibration, i.e. the updating of the correction coefficient $F_{offset}$.

Thus, once the correction coefficient has been changed and during a predefined stabilisation period $t_{min}$, the correction coefficient $F_{offset}$ remains constant.

This advantageously avoids oscillations caused by the fact that the correction coefficient influences the force measurement, which is used to determine the next value of the correction coefficient.

By setting the stabilisation period $t_{min}$ to be longer than the acquisition time of the n values, it is ensured that the values used to calculate the new correction coefficient $F_{offset}$ have all been measured with the previous value of the correction coefficient $F_{offset}$ However, this inhibition might not be implemented. When implemented, this inhibition can be interrupted or reset by the self-calibration module 12 (reset signal).

Finally, optionally, the robot or its immediate environment can be equipped with a temperature sensor. Ideally, in the case of an external force measuring device consisting of a force sensor placed at the end of the robot, the temperature sensor will be in close proximity to this sensor. The temperature measurement provided by the load cell is stored whenever the correction factor $F_{offset}$ is changed. Then, the vector of predetermined thresholds on the average force $F_{max}$ can be defined as an increasing function of the difference between the current temperature $T_{current}$, and the stored temperature $T_{mem}$. For example:

$$F_{max} = F_{max,0} + k \cdot |T_{current} - T_{mem}| \quad \text{[Equation 8]}$$

where $F_{max,0}$ and k are vectors of the same dimension as the vector of predetermined thresholds on the average force $F_{max}$, and have predefined values.

Indeed, if the temperature has changed a lot, the real force offset will probably have varied more too. It is therefore beneficial to increase the threshold in this case to promote recalibration.

Figure 4:
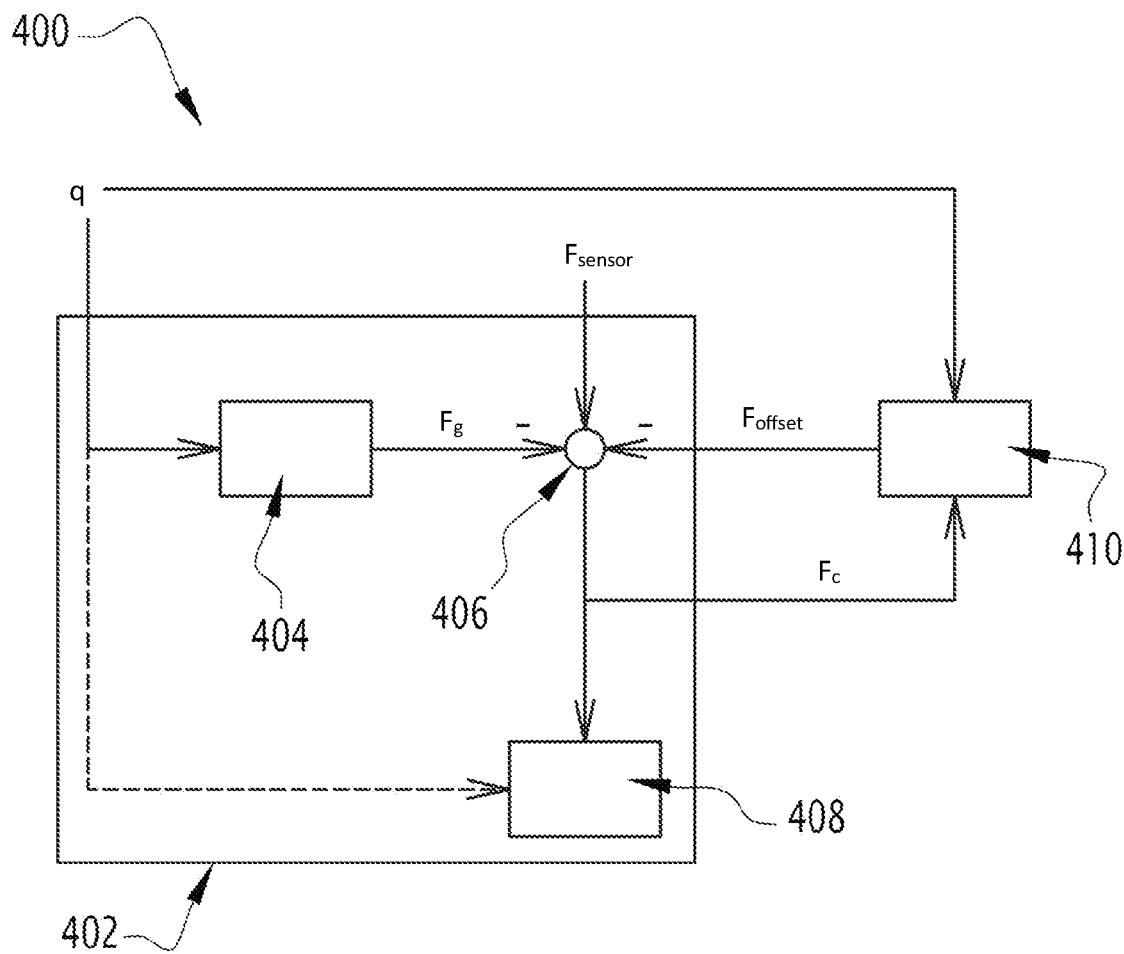
FIG. 4 is a schematic block diagram illustrating a first example robot command according to the invention.
Figure 5:
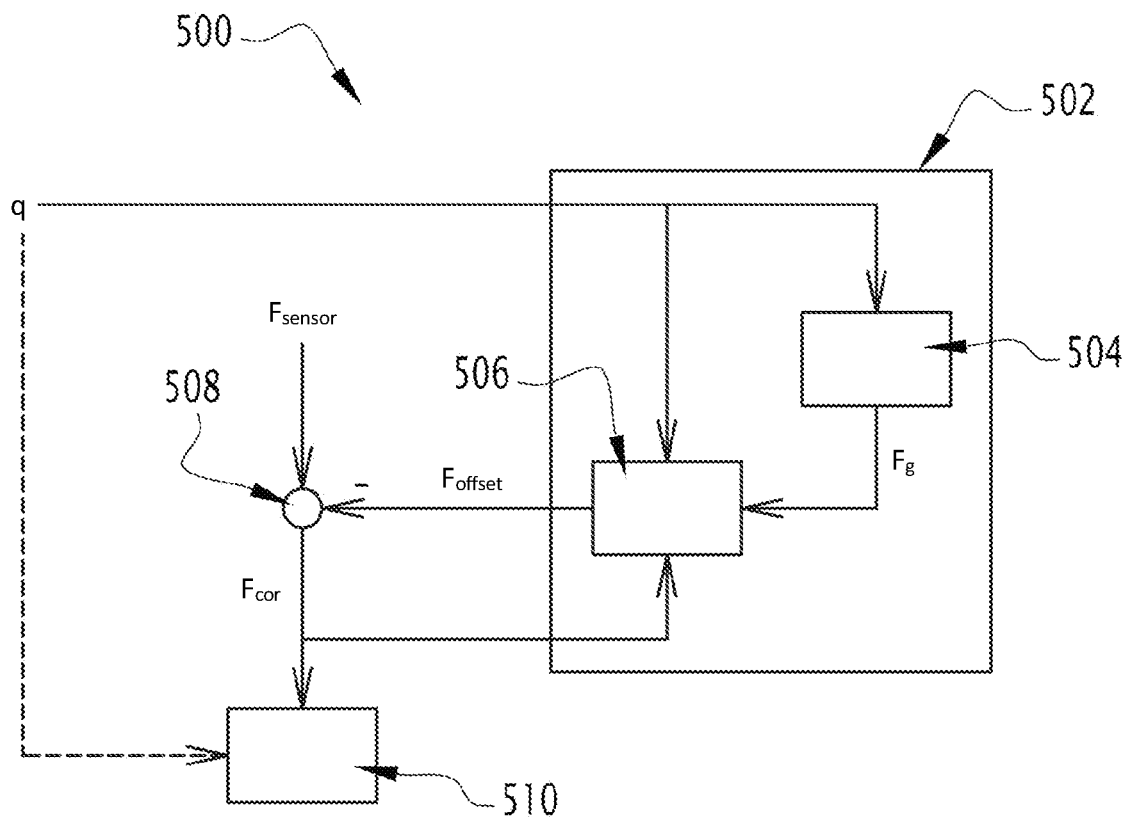
FIG. 5 is a schematic block diagram illustrating a second example robot command according to the invention.
Figure 6:
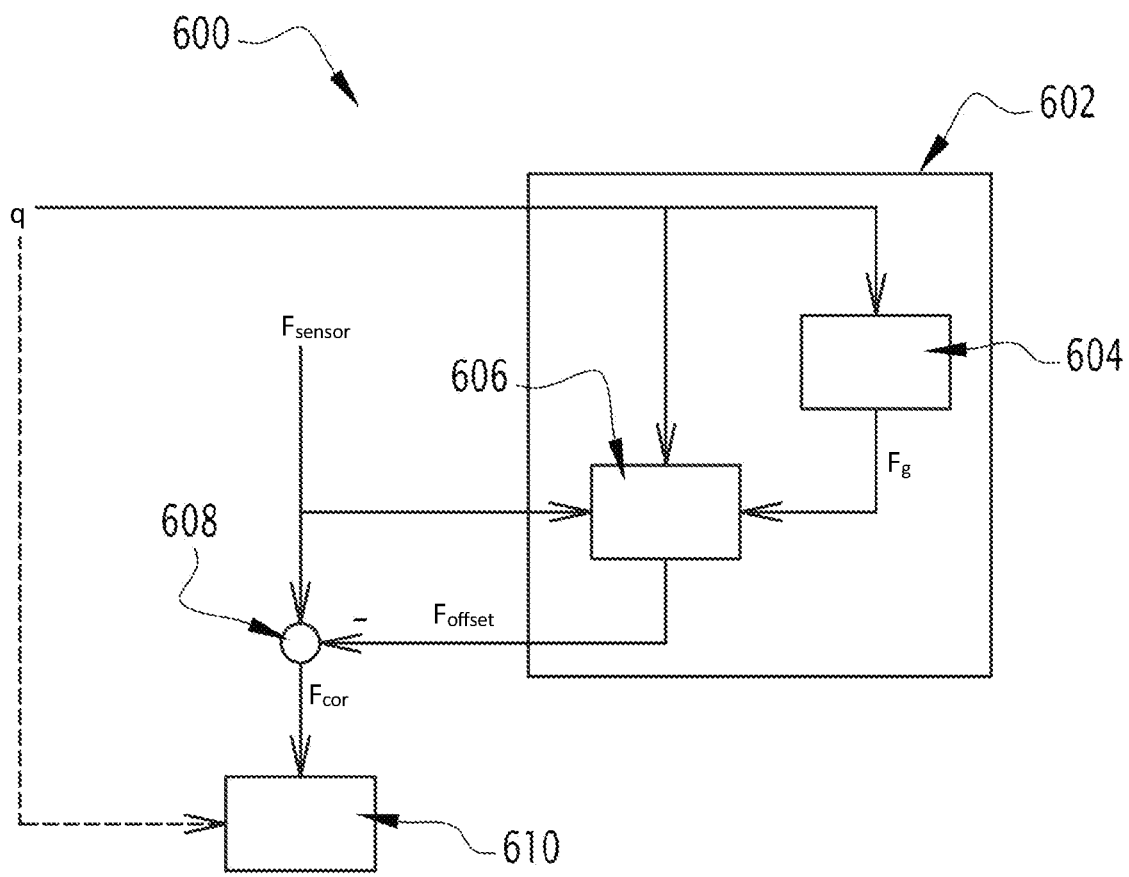
FIG. 6 is a schematic block diagram illustrating a third example robot command according to the invention.

FIGS. 4 to 6 illustrate examples implementing the self-calibration method according to the invention during the different command cycles during the operation of the robot 2 or 200.

FIG. 4 shows a first example 400.

In block 402, the "weight model" 404 is used to determine the mass effect of the robot Fg from the calculated positions.

In the above diagram, the force control module (block 408) used to control the robot uses the external force Fc as an input, the latter being obtained by subtracting (block 406) from the measured external force $F_{sensor}$ the correction coefficient $F_{offset}$ given by the self-calibration process according to the invention (block 410) and the mass effect of the robot Fg.

FIG. 5 shows a second example 500.

In the above diagram, within block 502, the "weight model" 504 is used to determine the mass effect of the robot Fg from the calculated positions and then provides the mass effect of the robot Fg to the self-calibration module 506, which implements the self-calibration method according to the invention.

The force control module 510 used to control the robot uses the corrected external force $F_{cor}$ at the output of block 508, the corrected external force $F_{cor}$ being equal to the measured external force $F_{sensor}$ from which the correction coefficient $F_{offset}$ is subtracted, without gravity compensation. In the force control module 510, the gravity compensation is achieved in a different way, for example with a more complex dynamic compensation.

FIG. 6 shows a third example 600.

As in the previous example, within block 602, the "weight model" 604 is used to determine the mass effect of the robot Fg from the calculated positions and then provides the mass effect of the robot Fg to the self-calibration module 606, which implements the self-calibration method according to the invention. The force control module 610 used to control the robot uses the corrected external force $F_{cor}$ at the output of block 608, the corrected external force $F_{cor}$ being equal to the measured external force $F_{sensor}$ from which the correction coefficient $F_{offset}$ is subtracted. In contrast, the self-calibration module 606 also uses the measured external force values $F_{sensor}$ measured by the external force measuring device 20.

In all the cases illustrated by FIGS. 4, 5 and 6, the self-calibration module implementing the self-calibration method according to the invention uses data calculated from the measured external force $F_{sensor}$ and the measured or calculated joint positions q.

A method for automatically calibrating an external force measuring device of an industrial robot (2), said industrial robot comprising a multi-axis robot arm (4), the robot arm comprising, for each joint axis, an electric actuator (M1, . . . M6) and a position sensor (C1, . . . C6) able to measure the joint position of the corresponding joint, the robot comprising a force measuring device (20), the force measuring device (20) comprising at least one measuring sensor capable of measuring the forces applied to the robot arm. The method updates an applied force correction coefficient by incrementing it with a value proportional to the average force of the external forces exerted if certain conditions are met.

Other implementations are possible.

The invention has been described with the simplest and most common architecture that allows the invention to be implemented. Many other architectures of the robot and/or the command system are possible.

The above-mentioned embodiments and variants envisaged above can be combined to create new embodiments.

The invention claimed is:

1. A method for automatically calibrating an external force measuring device of an industrial robot, the industrial robot comprising a multi-axis robot arm, the robot arm comprising, for each joint axis, an electric actuator and a position sensor able to measure a joint position of the corresponding joint, the robot comprising a force measuring device, the force measuring device comprising at least one measuring sensor capable of measuring the forces applied to the robot arm, the method comprising the steps of:

for a plurality of successive measurement cycles, storing the joint position of the robot arm and calculating an external force exerted on the external force measuring device, the external force exerted being equal to the external force measured by the external force measuring device minus a drift correction coefficient of the external force measuring device applied to the robot arm and a mass effect of the robot;

after a predefined number n of successive measurement cycles, for each subsequent cycle, calculating an indicator of variation in external force exerted and a motion indicator, the indicator of variation in external force exerted being representative of a variation in external force exerted during a last n measurement cycles, the motion indicator being representative of a variation in joint position during the measurement cycles;

calculating an average force of the external forces exerted during the last n measurement cycles;

updating the correction coefficient by incrementing it with a value proportional to the average force of the external forces exerted if the following conditions are met:

the motion indicator is below a vector of predetermined positional variation thresholds, and the indicator of variation in external force exerted is below a vector of predetermined force variation thresholds, and the average force of the external forces exerted is, as an absolute value, less than a vector of predetermined thresholds on the average force.

2. The method according to claim 1, wherein the force measuring device is a multi-axis force sensor placed between an end of the robot arm and an end effector.

3. The method according to claim 1, wherein the force measuring device is a set of force sensors placed at each joint of the robot arm.

4. The method according to claim 1, wherein the joint position of the robot arm is given by measurement.

5. The method according to claim 1, wherein when updating the correction coefficient, the value proportional to the average force of the external forces exerted is equal to said average force of the external forces exerted multiplied by a proportionality coefficient comprised between 0 and 1.

6. The method according to claim 1, wherein a number n of successive measurement cycles is greater than 100.

7. The method according to claim 1, wherein the updating of the correction coefficient is inhibited if an update of the correction coefficient has already taken place less than a predetermined stabilisation period earlier.

8. The method according to claim 1, wherein the vector of predetermined thresholds on the average force is calculated from temperature information of the external force measuring device of the industrial robot.

9. The method according to claim 1, wherein the indicator of variation of exerted external force is equal to a difference between a maximum of the external force exerted and a minimum of the exerted external force during the measurement cycles.

10. The method according to claim 1, wherein the motion indicator is equal to a difference between a maximum and a minimum of the joint positions for each joint axis of the robot, during the measurement cycles.

11. An industrial robot comprising a multi-axis robot arm, the robot arm comprising, for each joint axis, an electric actuator and a position sensor able to measure the joint position of the corresponding joint, the robot comprising a force measuring device, the force measuring device, comprising at least one measuring device capable of measuring the forces applied to the robot arm, the robot comprising a central processing unit configured to implement a method according to claim 1.

* * * * *